F. KNOOP.
TOOL HOLDER.
APPLICATION FILED FEB. 16, 1920.
1,415,578. Patented May 9, 1922.
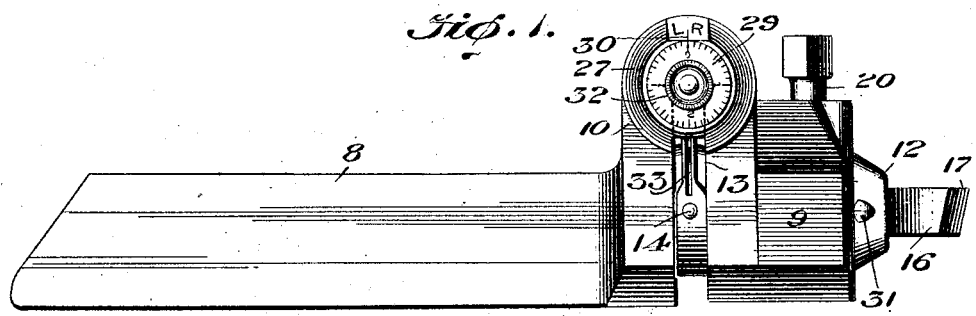

UNITED STATES PATENT OFFICE.

FREDERICK KNOOP, OF WASHINGTON, DISTRICT OF COLUMBIA.

TOOL HOLDER.

1,415,578. Specification of Letters Patent. Patented May 9, 1922.

Application filed February 16, 1920. Serial No. 358,895.

*To all whom it may concern:*

Be it known that I, FREDERICK KNOOP, a citizen of the United States, residing at Washington, in the District of Columbia, have invented certain new and useful Improvements in Tool Holders, of which the following is a specification.

This invention relates to tool holders, and more particularly to tool holders for use in cutting threads.

The principal features of invention are accurate angular adjustability of the cutter or bit clamping collet to set the tool holder to cut threads of various angular pitches; provision for the ready interchange of bits, of simple bar form, ground to cut threads of different forms, or specially shaped for other classes of work; and provision of a single means to lock the bit in the collet and lock the collet in the holder so that the adjusting means can never be subjected to heavy stress incident to the cutting action of the tool.

Subordinate features of the invention reside in the form and arrangement of the parts, and provide a tool of simple rugged form, devoid of large projections, particularly lateral projections, and having the resilient goose neck so desirable for smooth thread cutting.

There has long been need for angularly adjustable threading tools for use in tool rooms, model shops and other shops where the thread forms are numerous and the volume of work is small. Heretofore attempts have been made to meet this need, but have resulted in cumbersome and inconvenient devices, requiring special and intricate forms of cutter, and entailing undesirable methods of use.

The tool holder provided by the present invention uses straight bar bits, inexpensive to make from any steel (including "high speed" steels); the cutting operation is the same as with any standard threading tool; and the form and dimensions of the complete holder closely approximate those of standard tool holders lacking the adjustment feature.

An embodiment of the invention successfully used by me is illustrated in the drawings, in which:—

Fig. 1 is a side elevation of the complete device, with the bit or cutter in position;

Fig. 2 is a plan view of the same;

Fig. 3 is a longitudinal vertical section through the head of the holder, showing the angularly adjustable collet and the clamping means;

Fig. 4 is a section on the line 4—4 of Fig. 3;

Fig. 5 is a side elevation of the collet removed from the holder;

Fig. 6 is a plan view of a special cutter designed for use in cutting threads to a shoulder; and Fig. 7 is a section on the line 7—7 of Fig. 5.

The shank of the tool holder, which is held in the tool post of the lathe, is shown at 8. This terminates at its forward end in a head 9, a goose-neck portion 10 being interposed between the shank 8 and head 9.

The head 9 is bored out horizontally to form a bearing for the angularly adjustable collet 11. This has a flange 12 at its forward end to limit its rearward motion. At its rear end the collet 11 is shouldered down to receive the worm-wheel sector 13 which is secured in place with a taper pin 14 and extends upward within the goose neck 10. This holds the collet against endwise movement. The collet 11 has a rectangular tool socket 15, which for ease in manufacture, extends the entire length of the collet. The socket 15 is designed to embrace closely an inserted rectangular bit 16 whose end 17 is ground to cut the desired thread form. The bits may be reversible, and ground at each end, and are so shown.

The collet 11 is formed with a surrounding groove 18 within which fits the clamping block 19. This is actuated by clamp screw 20 threaded in head 9. At either side of groove 18 the collet 11 is cut transversely part way through, as shown at 21 and 22, and these cuts are connected by a longitudinal cut 23, leaving a resilient portion which forms a clamping tongue 24. When the screw 20 is set down the block 19 is forced against tongue 24 and simultaneously locks bit 16 in collet 11 and locks collet 11 against rotation.

The worm wheel sector 13 is actuated by a worm 25. This turns in a step bearing 26 in goose neck 10 and is also swiveled in a plate 27 held to goose neck 10 by screws 28. The worm 25 carries a graduated head 29 whose graduations are read against an index 30 on plate 27 and indicate the angular position of collet 11. The marks "L" and "R" on plate 27, respectively indicate the direction of adjustment from the zero position of the collet for left hand and right hand threads. Since the adjustment of collet 11 for quick pitch threads requires several turns of worm 25, index lines 31 are placed on the flange 12 of collet 11 and on head 9 to indicate by their register the zero position of the collet. To avoid the possibility of injury to the worm and worm wheel sector by forcibly turning the worm while the collet is clamped, the milled head 32 is purposely made small so as to offer a poor hold. To reduce backlash the worm wheel is slotted at 33 and so mounted that the two sides of the sector embrace the worm resiliently.

When threading to a shoulder, I use a bit such as shown in Fig. 6. With this bit the shank of the tool holder is set at an angle.

The proper angle of adjustment for any thread may be readily determined. A tabulation of adjustments for all standard threads should be provided, and special cases may be solved by the use of a simple formula and a table of natural tangents. The head 29 is graduated in degrees of angle of adjustment of the collet, one turn of the worm producing an adjustment of the collet of four degrees. Any other suitable ratio of adjustment might be used, but I find this to be convenient and to give satisfactory dimensions of the worm and worm wheel sector.

The manner of using the tool holder is obvious to those skilled in the art. An important feature of the device is that since the collet 11 is clamped against turning by the act of clamping the bit in the collet, and since the bit cannot cut unless clamped in the collet, the worm adjusting mechanism can never be subjected, even by inadvertence, to heavy stress. This feature allows the use of a small adjusting mechanism and greatly reduces the size and improves the form of the tool.

The clearance at the rear of worm wheel sector 13 need be only a few thousandths of an inch to accommodate the necessary yielding of the goose neck 10, and this clearance is preferably made as small as conveniently possible to reduce the size of the tool holder to a minimum.

Various minor modifications may be made without departing from the spirit of the invention. The graduated head and the worm reduction gear form in effect an indexing head for the collet and tool, i. e., an accurate positive indicating and adjusting mechanism. The effective elements are, broadly, some type of graduated dial and a suitable reduction gear, but I prefer the worm and graduated head for the simplicity, compactness and maintained accuracy.

What is claimed is:

1. In a threading tool, the combination of a tool stock; a cutting tool mounted upon said stock and capable of angular adjustment thereon to adapt it to cut threads of different angular pitches; adjusting means for said tool including a dial and a reduction gear; and a clamp acting between the stock and tool and serving to clamp the tool to the stock in its adjusted positions.

2. In a threading tool, the combination of a tool stock; a cutting tool mounted upon said stock and capable of angular adjustment thereon to adapt it to cut threads of different angular pitches; adjusting means for said tool including a worm reduction gear; and a clamp acting between the stock and tool, independent of the worm reduction gear, and serving to lock the tool to the stock in its angularly adjusted positions.

3. In a threading tool, the combination of a tool stock formed with a goose neck; a cutting tool mounted upon said stock and capable of angular adjustment thereon to adapt it to cut threads of different angular pitches; adjusting means for said tool including a dial and a reduction gear housed within said goose neck; and a clamp acting between said stock and tool and serving to clamp the tool to the stock in its angularly adjusted positions.

4. In a threading tool, the combination of a tool stock; a tool holding member mounted upon said stock and capable of angular adjustment thereon to set a tool held thereby to cut threads of different angular pitches; adjusting means for said member, including a dial and a reduction gear; and clamping means acting directly between said stock and said member and serving to lock said member to said stock in its angularly adjusted positions.

5. In a threading tool, the combination of a tool stock formed with a goose-neck; a tool holding member mounted upon said stock and capable of angular adjustment thereon to set the tool held thereby to cut threads of different angular pitches; adjusting means for said member including a dial, and a reduction gear housed in said goose neck; and clamping means acting directly between said stock and said member and serving to lock said member to said stock in its angularly adjusted positions.

6. In a threading tool, the combination of a tool stock; a collet mounted in said stock and capable of angular adjustment therein; a cutting tool mounted in said collet, the angular adjustment of the collet serving to set the tool to cut threads of different angular pitches; adjusting means serving to adjust the angular position of the collet, said means including a dial and a reduction gear; and a single clamping means serving to clamp the the collet upon the tool and to lock the collet in said stock against movement from its adjusted position.

7. In a threading tool, the combination of a tool stock formed with a goose neck; a collet mounted in said stock and capable of angular adjustment therein; a cutting tool mounted in said collet, the angular adjustment of the collet serving to set the tool to cut threads of different angular pitches; a worm reduction gear housed in said goose neck and serving to adjust the angular position of said collet; and a single clamping means serving to clamp the collet upon the tool and to lock the collet in said stock against movement from its adjusted positions.

8. A threading tool holder, comprising in combination, a goose neck stock; a tool clamping collet angularly adjustable in said stock; an indexing head serving to adjust the angular position of said collet; and means for clamping the collet.

9. A threading tool holder, comprising in combination, a tool stock; a collet capable of angular adjustment in said stock and having a portion adapted to be clamped upon an inserted tool; an indexing head serving to adjust the angular position of said collet; and a single clamping means serving to clamp the collet upon an inserted tool and to hold the collet against movement from its adjusted position.

10. A threading tool holder, comprising in combination, a tool stock; a rigid cylindrical collet capable of angular adjustment in said stock to set the holder for thread cutting at different angular pitches, said collet having a flexible integral tongue adapted to be clamped upon an inserted tool without substantial deformation of the remainder of the collet; and a single clamping means serving to clamp said tongue upon a tool inserted in the collet and simultaneously to hold the collet against movement from its adjusted position.

11. A threading tool holder, comprising in combination, a tool stock; a rigid cylindrical collet capable of angular adjustment in said stock to set the holder for thread cutting at different angular pitches, said collet having a flexible integral tongue adapted to be clamped upon an inserted tool without substantial deformation of the remainder of the collet; a single clamping means serving to clamp said tongue upon a tool inserted in the collet and simultaneously to hold the collet against movement from its adjusted position; and a motion-multiplying indicator serving to indicate the angular adjustment of said collet.

12. A threading tool-holder comprising in combination, a stock; a tool clamping collet angularly adjustable with reference thereto; a motion multiplying indicator serving to indicate the angular adjustment of said collet with reference to said stock; and means for clamping the collet in its adjusted positions.

13. A threading tool-holder comprising in combination, a stock; a tool angularly adjustable with reference thereto; a motion multiplying indicator serving to indicate such angular adjustments of said tool; and means serving to lock the tool in its angularly adjusted positions.

In testimony whereof I have signed my name to this specification.

FREDERICK KNOOP.